US010796692B2

(12) United States Patent
Cantu (10) Patent No.: US 10,796,692 B2
(45) Date of Patent: Oct. 6, 2020

(54) ASSISTIVE LISTENING DEVICE AND HUMAN-COMPUTER INTERFACE USING SHORT-TIME TARGET CANCELLATION FOR IMPROVED SPEECH INTELLIGIBILITY

(71) Applicant: Marcos A. Cantu, Rancho Viejo, TX (US)

(72) Inventor: Marcos A. Cantu, Rancho Viejo, TX (US)

( * ) Notice: Subject to any disclaimer, the term of this patent is extended or adjusted under 35 U.S.C. 154(b) by 0 days.

(21) Appl. No.: 16/514,669

(22) Filed: Jul. 17, 2019

(65) Prior Publication Data

US 2020/0027451 A1    Jan. 23, 2020

Related U.S. Application Data

(63) Continuation of application No. PCT/US2019/042046, filed on Jul. 16, 2019.
(Continued)

(51) Int. Cl.
*G10L 15/20* (2006.01)
*H04R 1/40* (2006.01)
(Continued)

(52) U.S. Cl.
CPC ........ *G10L 15/20* (2013.01); *G10K 11/17823* (2018.01); *G10K 11/17873* (2018.01);
(Continued)

(58) Field of Classification Search
CPC ......... G10L 15/02; G10L 15/20; G10L 15/22; G10L 21/02; G10L 15/08; G10L 15/265;
(Continued)

(56) References Cited

U.S. PATENT DOCUMENTS

2008/0181422 A1* 7/2008 Christoph ........ G10K 11/17817
381/73.1
2008/0215651 A1* 9/2008 Sawada ............... G10L 21/0272
708/205

(Continued)

*Primary Examiner* — Yogeshkumar Patel
(74) *Attorney, Agent, or Firm* — Craig J. Lervick; Larkin Hoffman Daly & Lindgren Ltd.

(57) ABSTRACT

An assistive listening device includes a set of microphones including an array arranged into pairs about a nominal listening axis with respective distinct intra-pair microphone spacings, and a pair of ear-worn loudspeakers. Audio circuitry performs arrayed-microphone short-time target cancellation processing including (1) applying short-time frequency transforms to convert time-domain audio input signals into frequency-domain signals for every short-time analysis frame, (2) calculating ratio masks from the frequency-domain signals of respective microphone pairs, wherein the calculation of a ratio mask includes a frequency domain subtraction of signal values of a microphone pair, (3) calculating a global ratio mask from the plurality of ratio masks, and (4) applying the global ratio mask, and inverse short-time frequency transforms, to selected ones of the frequency-domain signals, thereby generating audio output signals for driving the loudspeakers. The circuitry and processing may also be realized in a machine hearing device executing a human-computer interface application.

19 Claims, 8 Drawing Sheets

Related U.S. Application Data (60) Provisional application No. 62/699,176, filed on Jul. 17, 2018.

(51) Int. Cl.
*H04R 3/00* (2006.01)
*H04R 5/027* (2006.01)
*H04R 1/04* (2006.01)
*H04S 7/00* (2006.01)
*G10L 15/18* (2013.01)
*G10K 11/178* (2006.01)
*G10L 15/22* (2006.01)

(52) U.S. Cl.
CPC .......... *G10L 15/1815* (2013.01); *G10L 15/22* (2013.01); *H04R 1/04* (2013.01); *H04R 1/406* (2013.01); *H04R 3/005* (2013.01); *H04R 5/027* (2013.01); *H04S 7/30* (2013.01); *H04R 2201/401* (2013.01); *H04R 2499/11* (2013.01); *H04S 2400/15* (2013.01)

(58) Field of Classification Search
CPC ............. G10L 15/28; G10L 2015/0631; G10L 2021/02087; G10L 15/1815; G10L 21/0208; G10L 2021/02166; H04R 3/005; H04R 1/406; H04R 2499/11; H04R 2201/401; H04R 5/027; H04R 1/04; H04R 25/405; H04R 2225/00; G10K 11/178; G10K 11/175; G10K 11/17881; G10K 11/17823; G10K 2210/3027; G10K 11/17873; H04S 7/30; H04S 7/303; H04S 2400/15
See application file for complete search history.

(56) References Cited

U.S. PATENT DOCUMENTS

2015/0112672 A1* 4/2015 Giacobello ......... G10L 21/0208
704/233
2019/0139563 A1* 5/2019 Chen ...................... G10L 25/30

* cited by examiner

ASSISTIVE LISTENING DEVICE AND HUMAN-COMPUTER INTERFACE USING SHORT-TIME TARGET CANCELLATION FOR IMPROVED SPEECH INTELLIGIBILITY

STATEMENT OF U.S. GOVERNMENT RIGHTS

The invention was made with U.S. Government support under National Institutes of Health (NIH) grant no. DC000100. The U.S. Government has certain rights in the invention.

TECHNICAL FIELD

The invention described herein relates to systems employing audio signal processing to improve speech intelligibility, including for example assistive listening devices (hearing aids) and computerized speech recognition applications (human-computer interfaces).

BACKGROUND

Several circumstances and situations exist where it is challenging to hear voices and conversations of other people. As one example, while in crowded areas or large crowds, it can often be challenging for most individuals to carry on a conversation with select people. The background noise can be somewhat extreme making it virtually impossible to hear comments/conversation of individual people. In another situation, those with hearing ailments can struggle with hearing in general, especially when trying to separate the comments/conversation of one individual from others in the area. This can even be a problem while in relatively small groups. In these situation, hearing assistance devices provide an invaluable resource.

Speech recognition is also a continual challenge for automated systems. Although great strides have been made, allowing automated voice recognition to be implemented in several devices and/or systems, further advances are possible. Generally, these automated systems still have difficulty identifying a specific voice, when other conversations are happening. This situation often occurs where an automated system is being used in open areas (e.g. office complexes, coffee shops, etc.).

The "cocktail party problem" presents a challenge for both established and experimental approaches from different fields of inquiry. There is the problem itself, isolating a target talker in a mixture of talkers, but there is also the question of whether a solution can be arrived at in real time, without context-dependent training beforehand, and without a priori knowledge of the number, and locations, of the competing talkers. This has proved to be an especially challenging problem given the extremely short time-scale in which a solution must be arrived at. In order to be usable in an assistive listening device (i.e., hearing aid), any processing would have to solve this sound source segregation problem within only a few milliseconds (ms), and must arrive at a new solution somewhere in the range of every 5 to 20 ms, given that the spectrotemporal content of the challenging listening environment changes rapidly over time.

The hard problem here is not the static noise sources (think of the constant hum of a refrigerator); the real challenge is competing talkers, as speech has spectrotemporal variations that established approaches have difficulty suppressing. Stationary noise has a spectrum that does not change over time, whereas interfering speech, with its spectrotemporal fluctuations, is an example of non-stationary noise.

There are various established methods that are effective for suppressing stationary noise. However, these established methods do not provide an intelligibility benefit in non-stationary noise (i.e., interfering talkers). What is needed to solve this problem is a time-varying filter capable of computing a new set of frequency channel filter weights every few milliseconds, so as to suppress the rapid spectrotemporal fluctuations of non-stationary noise (i.e., interfering talkers). Various attempts to address these problems have been made, however many are not able to operate efficiently, or in real-time. Consequently, the challenge of suppressing non-stationary noise from interfering sound sources still exists.

SUMMARY

What is needed to solve the above mentioned problem is a time-varying filter capable of computing a new set of frequency channel weights every few milliseconds, so as to suppress the rapid spectrotemporal fluctuations of non-stationary noise. The devices described herein compute a time-varying filter, with causal and memoryless "frame by frame" short-time processing that is designed to run in real time, without any a priori knowledge of the interfering sound sources, and without any training. The devices described herein enhance speech intelligibility in the presence of both stationary and non-stationary noise (i.e., interfering talkers).

The devices described herein leverage the computational efficiency of the Fast Fourier Transform (FFT). Hence, they are physically and practically realizable as devices that can operate in real-time, with reasonable and usable battery life, and without reliance on signifcant computational resources. The processing is designed to use short-time analysis windows in the range of 5 to 20 ms; for every analysis frame, frequency-domain signals are computed from time-domain signals, a vector of frequency channel weights are computed and applied in the frequency domain, and the filtered frequency domain signals are converted back into time domain signals.

In one variation, an Assistive Listening Device (ALD) employs an array (e.g., 6) of forward-facing microphones whose outputs are processed by Short-Time Target Cancellation (STTC) to compute a Time-Frequency (T-F) mask (i.e., time-varying filter) used to attenuate non-target sound sources in Left and Right near-ear microphones. The device can enhance speech intelligibility for a target talker from a designated look direction while preserving binaural cues that are important for spatial hearing.

In another application, STTC processing is implemented as a computer-integrated front-end for machine hearing applications such as Automatic Speech Recognition (ASR) and teleconferencing. More generally, the STTC front-end approach may be used for Human-Computer Interaction (HCI) in environments with multiple competing talkers, such as restaurants, customer service centers, and air-traffic control towers. Variations could be integrated into use-environment structures such as the dashboard of a car or the cockpit of an airplane.

More particularly, in one aspect an assistive listening device is disclosed that includes a set of microphones generating respective audio input signals and including an array of the microphones being arranged into pairs about a nominal listening axis with respective distinct intra-pair microphone spacings, and a pair of ear-worn loudspeakers. Audio circuitry is configured and operative to perform arrayed-microphone short-time target cancellation processing including (1) applying short-time frequency transforms to convert the audio input signals into respective frequency-domain signals for every short-time analysis frame, (2) calculating respective pair-wise ratio masks and binary masks from the frequency-domain signals of respective microphone pairs of the array, wherein the calculation of a ratio mask includes a frequency domain subtraction of signal values of a microphone pair, (3) calculating a global ratio mask from the pair-wise ratio masks and a global binary mask from the pair-wise binary masks, (4) calculating a thresholded ratio mask, an effective time-varying filter with a vector of frequency channel weights for every short-time analysis frame, from the global ratio mask and global binary mask, and (5) applying the thresholded ratio mask, and inverse short-time frequency transforms to selected ones of the frequency-domain signals to generate audio output signals for driving the loudspeakers. Although the preferred processing involves using the thresholded ratio mask to produce the output, an effective assistive listening device that enhances speech intelligibility could be built using only the global ratio mask.

In another aspect, a machine hearing device is disclosed that includes processing circuitry configured and operative to execute a machine hearing application to identify semantic content of a speech signal supplied thereto and to perform an automated action in response to the identified semantic content, and a set of microphones generating respective audio input signals and including an array of the microphones arranged into pairs about a nominal listening axis with respective distinct intra-pair microphone spacings. Audio circuitry is configured and operative to perform arrayed-microphone short-time target cancellation processing including (1) applying short-time frequency transforms to convert the audio input signals into respective frequency-domain signals for every short-time analysis frame, (2) calculating respective pair-wise ratio masks and binary masks from the frequency-domain signals of respective microphone pairs of the array, wherein the calculation of a ratio mask includes a frequency domain subtraction of signal values of a microphone pair, (3) calculating a global ratio mask from the pair-wise ratio masks and a global binary mask from the pair-wise binary masks, (4) calculating a thresholded ratio mask, an effective time-varying filter with a vector of frequency channel weights for every short-time analysis frame, from the global ratio mask and global binary mask, and (5) applying the thresholded ratio mask and inverse short-time frequency transforms to selected ones of the frequency-domain signals to generate audio output signals for driving the loudspeakers. Although the preferred processing involves using the thresholded ratio mask to produce the output, an effective machine hearing device could be built using only the global ratio mask.

There are existing methods, including adaptive beamformers such as the Multichannel Wiener Filter (MWF) and Minimum Variance Distortionless Response (MVDR) beamformers, that use past values (i.e., memory) to compute a filter that can attenuate stationary sound sources; these methods are appropriate for attenuating the buzz of a refrigerator or the hum of an engine, which are stationary sound sources that do not have unpredictable spectrotemporal fluctations. The approach described herein uses Short-Time Target Cancellation (STTC) processing to compute a time-varying filter using only the data from short-time analysis windows; it computes a time-varying filter, in the form of a vector of frequency channel weights for every analysis frame, using only the data from the current analysis frame. As such, it is causal, memoryless, is capable of running in real time, and can be used to attenuate both stationary and non-stationary sound sources.

The approach and devices described herein can attenuate interfering talkers (i.e., non-stationary sound sources) using real-time processing. Another advantage of the approach described herein, relative to adaptive beamformers such as the MWF and MVDR, is that the time-varying filter computed by the STTC processing is a set of frequency channel weights that can be applied independently to signals at the Left and Right ear, thereby enhancing speech intelligibility for a target talker while still preserving binaural cues for spatial hearing.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DESCRIPTION OF EMBODIMENTS

Figure 1:
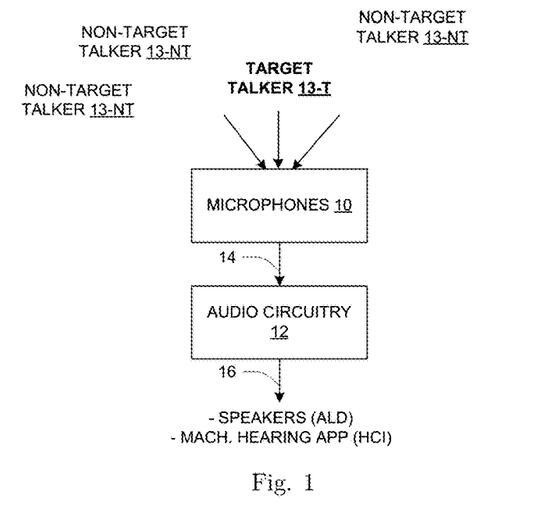
FIG. 1 is a general block diagram of a system employing STTC processing for improving speech intelligibility for a target talker.

FIG. 1 shows an audio system in generalized form, including microphones [10] having outputs coupled to audio circuitry [12]. In operation, the microphones [10] respond to acoustic input of an immediate environment that includes a target talker [13-T] and one or more non-target talkers [13-NT], generating respective audio signals [14]. These are supplied to the audio circuitry [12], which applies short-time target cancellation (STTC) processing to enhance the intelligibility of the target talker [13-T] in the presence of the interfering non-target talkers [13-NT]. Details of the STTC processing are provided herein.

The general arrangement of FIG. 1 may be realized in a variety of more specific ways, two of which are described in some detail. In one realization, the arrangement is incorporated into an assistive listening device (ALD) or "hearing aid", and in this realization the outputs [16] from the audio circuitry [12] are supplied to in-ear or near-ear loudspeakers (not shown in FIG. 1). In another realization, the arrangement is used as initial or "front end" processing of a human-computer interface (HCI), and the outputs [16] convey noise-reduced speech input to a machine hearing application (not shown in FIG. 1). Again, multiple realizations are possible.

Figure 2:
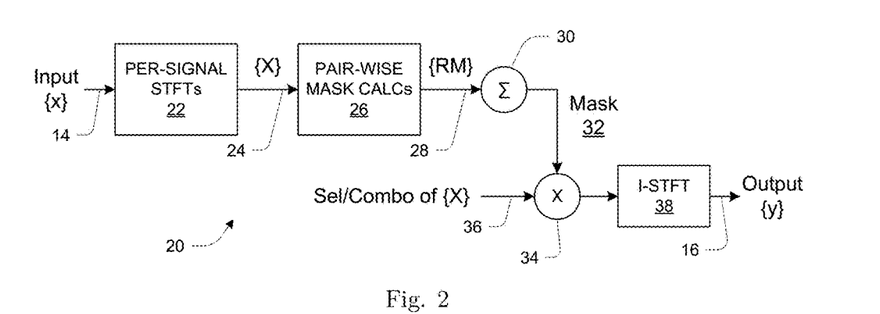
FIG. 2 is a general block diagram of STTC processing.

FIG. 2 is a generalized description of the STTC processing [20] carried out by the exemplary audio circuitry [12]. This processing [20] includes a set of short-time Fourier transforms (STFTs) [22], each applied to a corresponding input signal [14] from a corresponding microphone [10], and each generating a corresponding frequency-domain signal [24]. The set of input signals [14] and the set of frequency-domain signals [24] are shown as x and X respectively. The STTC processing [20] further includes a set of pair-wise mask calculations [26], each operating upon a corresponding pair of the frequency-domain signals [24] and generating a corresponding ratio mask (RM) [28] (the set of all ratio masks shown as RM). A combiner [30] combines the ratio masks [28] into an overall mask [32], which is provided to a scaler [34] along with a selection or combination (Sel/Combo) [36] of the frequency-domain signals {X}. The output of the scaler [34] is a noise-reduced frequency-domain signal supplied to an inverse-STFT (I-STFT) [38] to generate the output signals) [16], shown as y.

Briefly, the selection/combination [36] may or may not include frequency domain signals X that are also used in the pair-wise mask calculations [26]. In an ALD implementation as described more below, it may be beneficial to apply the mask-controlled scaling [34] to signals from near-ear microphones that are separate from the microphones whose outputs are used in the pair-wise mask calculations [26]. Use of such separate near-ear microphones can help maintain important binaural cues for a user. In a computer-based implementation also described below, the mask-controlled scaling [34] may be applied to a sum of the outputs of the same microphones whose signals are used to calculate the masks.

I. System Description of 6-Microphone Short-Time Target Cancellation (STTC) Assistive Listening Device (ALD).

Figure 3:
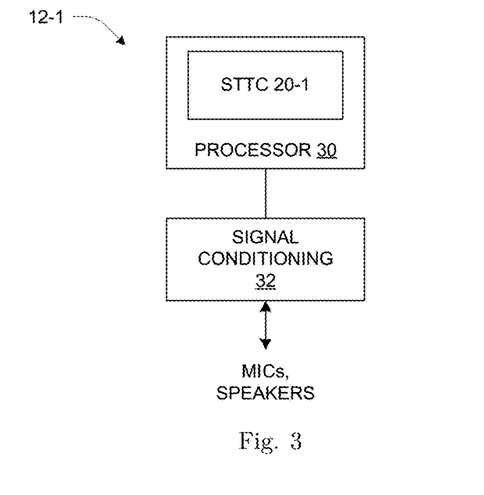
FIG. 3 is a block diagram of audio circuitry of an assistive listening device (ALD)

FIGS. 3-8 show an embodiment of an assistive listening device (ALD) using 6-microphone STTC. As will be recognized, this provides one version of an effective ALD, however many variations are possible. FIG. 3 is a block diagram of first audio circuitry [12-1] of the 6-microphone ALD. It includes a processor [30] performing first STTC processing [20-1], as well as signal conditioning circuitry [32]. The signal conditioning circuitry [32] interfaces the processor [30] with the separate microphones and loudspeakers (not shown), and generally includes signal converters (digital to analog, analog to digital), amplifiers, analog filters, etc. as needed. In some embodiments, some or all of the conditioning circuitry [32] may be included with the processor [30] in a single integrated or hybrid circuit, and such a specialized circuit may be referred to as a digital signal processor or DSP.

Figure 4:
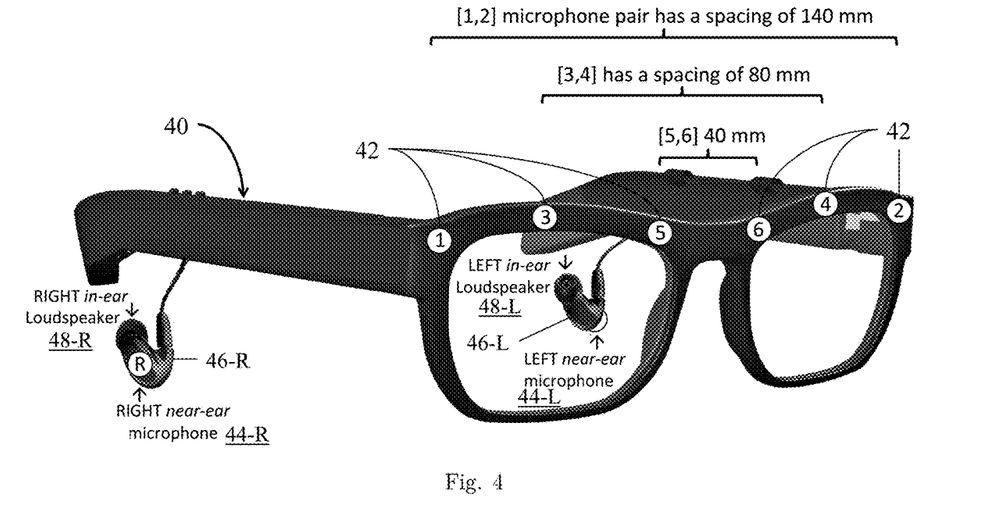
FIG. 4 is a depiction of a specialized eyeglass frame incorporating components of an ALD.

FIG. 4 shows an example physical realization of an assistive listening device or ALD, specifically as a set of microphones and loudspeakers incorporated in an eyeglass frame [40] worn by a user. In this realization, the microphones [10] are realized using six forward-facing microphones [42] and two near-ear microphones [44-R], [44-L]. The forward-facing microphones [42] are enumerated 1-6 as shown, and functionally arranged into pairs 1-2, 3-4 and 5-6, with respective distinct intra-pair spacings of 140 mm, 80 mm and 40 mm respectively in one embodiment. The near-ear microphones [44] are included in respective right and left earbuds [46-R], [46-L] along with corresponding in-ear loudspeakers [48-R], [48-L].

Generally, the inputs from the six forward-facing microphones [42] are used to compute a Time-Frequency (T-F) mask (i.e. time-varying filter), which is used to attenuate non-target sound sources in the Left and Right near-ear microphones [44-L], [44-R]. The device boosts speech intelligibility for a target talker [13-T] from a designated look direction while preserving binaural cues that are important for spatial hearing.

The approach described herein avoids Interaural level Difference (ILD) compensation by integrating the microphone pairs [42] into the frame [40] of a pair of eyeglasses and giving them a forward facing half-omni directionality pattern; with this microphone placement, there is effectively no ILD and thus no ILD processing is required. One downside to this arrangement, if one were to use only these forward facing microphones, is the potential loss of access to both head shadow ILD cues and the spectral cues provided by the pinnae (external part of ears). However, such cues can be provided to the user by including near-ear microphones [44]. The forward-facing microphone pairs [42] are used to calculate a vector of frequency channel weights for each short-time analysis frame (i.e., a time-frequency mask); this vector of frequency channel weights is then used to filter the output of the near-ear microphones [44]. Notably, the frequency channel weights for each time slice may be applied independently to both the left and right near-ear microphones [44-L], [44-R], thereby preserving Interaural Time Difference (ITD) cues, spectral cues, and the aforementioned ILD cues. Hence, the assistive listening device described herein can enhance speech intelligibility for a target talker, while still preserving the user's natural binaural cues, which are important for spatial hearing and spatial awareness.

It is noted that the ALD as described herein may be used in connection with separate Visually Guided Hearing Aid (VGHA) technology, in which a VGHA eyetracker can be used to specify a steerable "look" direction. Steering may be accomplished using shifts, implemented in either the time domain or frequency domain, of the Left and Right signals. The STTC processing [20-1] boosts intelligibility for a target talker [13-T] in the designated "look" direction and suppresses the intelligibility of non-target talkers (or distractors) [13-NT], all while preserving binaural cues for spatial hearing.

STTC processing consists of a computationally efficient implementation of the target cancellation approach to sound source segregation, which involves removing target talker sound energy and computing gain functions for T-F tiles according to the degree to which each T-F tile is dominated by energy from the target or interfering sound sources. The STTC processing uses subtraction in the frequency domain to implement target cancellation, using only the Short-Time Fourier Transforms (STFTs) of signals from microphones.

The STTC processing computes an estimate of the Ideal Ratio Mask (IRM), which has a transfer function equivalent to that of a time-varying Wiener filter; the IRM uses the ratio of signal (i.e., target speech) energy to mixture energy within each T-F unit:

$$IRM(t, f) = \frac{S^2(t, f)}{S^2(t, f) + N^2(t, f)} \quad (1)$$

where $S^2(t, f)$ and $N^2(t, f)$, are the signal (i.e., target speech) energy and noise energy, respectively. The mixture energy is the sum of the signal energy and noise energy.

The time-domain mixture $x_i[m]$ of sound at the ith microphone is composed of both signal ($s_i$) and noise ($\eta_i$) components:

$$x_i[m] = s_i[m] + \eta_i[m] \quad (2)$$

Effecting sound source segregation amounts to an "unmixing" process that removes the noise ($\eta$) from the mixture ($x$) and computes an estimate ($\hat{s}$) of the signal ($s$). Whereas the IRM is computed using "oracle knowledge" access to both the "ground truth" signal ($s_i$) and the noise ($\eta_i$) components, the STTC processing has access to only the mixture ($x_i$) at each microphone. For every pair of microphones, the STTC processing computes both a Ratio Mask (RM) and a Binary Mask (BM) using only the STFTs of the sound mixtures at each microphone. The STFT $X_i[n, k]$ of the sound mixture $x_i[m]$ at the ith microphone is as follows:

$$X_i[n, k] = STFT\{x_i[m]\} = \sum_{m=-\infty}^{\infty} x_i[m] w[nH - m] e^{-j\frac{2\pi k}{F}m} \quad (3)$$

where $w[n]$ is a finite-duration Hamming window; n and k are discrete indices for time and frequency, respectively; H is a temporal sampling factor (i.e., the Hop size between FFTs) and F is a frequency sampling factor (i.e., the FFT length).

The logic underlying the STTC processing involves computing an estimate of the noise ($\eta$), so as to subtract it from the mixture ($x$) and compute an estimate ($\hat{s}$) of the signal ($s$). This filtering (i.e. subtraction of the noise) is effected through a T-F mask, which is computed via target cancellation in the frequency domain using only the STFTs. The STTC processing consists of Short-Time Fourier Transform Magnitude (STFTM) computations, computed in parallel, that yield Mixture ($\hat{M}$) and Noise ($\hat{N}$) estimates that can be used to approximate the IRM, and thereby compute a time-varying filter. The Mixture ($\hat{M}$), Noise ($\hat{N}$) and Signal ($\hat{S}$) estimates for each T-F tile are computed as follows using the frequency-domain signals ($X_i$) from a pair (i=[1, 2]) of microphones:

$$\hat{M}[n,k] = 0.5 \times (|X_1[n,k]| + |X_2[n,k]|), \quad (4)$$

$$\hat{N}[n,k] = 0.5 \times (|X_1[n,k] - X_2[n,k]|), \quad (5)$$

$$\hat{S}[n,k] = \hat{M}[n,k] - \hat{N}[n,k] \quad (6)$$

The processing described here assumes a target talker "straight ahead" at V With the target-talker waveforms at the two microphones in phase (i.e., time-aligned) with each other, the cancellation process can be effected via subtraction in either the time domain (e.g., $x_1[m] - x_2[m]$) or the frequency domain, as in the Noise (N) estimate shown above.

The Noise estimate ($\hat{N}$) is computed by subtracting the STFTs before taking their magnitude, thereby allowing phase interactions that cancel the target spectra. The Mixture ($\hat{M}$) estimate takes the respective STFT magnitudes before addition, thereby preventing phase interactions that would otherwise cancel the target spectra. A Signal ($\hat{S}$) estimate can be computed by subtracting the Noise ($\hat{N}$) estimate from the Mixture ($\hat{M}$) estimate. The processing described in this section assumes a target talker "straight ahead" at 0°. However, the "look" direction can be "steered" via sample shifts implemented in the time domain prior to T-F analysis. Alternatively, these "look" direction shifts could be implemented in the frequency domain.

Assuming a perfect cancellation of only the target (i.e., Signal) spectra, the $\hat{N}$ term contains the spectra of all non-target sound sources (i.e., Noise) in each T-F tile. The STTC processing uses the Mixture ($\hat{M}$) and Noise ($\hat{N}$) STFTM computations to estimate the ratio of Signal ($\hat{S}$) (i.e., target) energy to mixture energy in every T-F tile:

$$RM[n, k] = \frac{\hat{M}[n, k] - \hat{N}[n, k]}{\hat{M}[n, k]} = \frac{\hat{S}[n, k]}{\hat{S}[n, k] + \hat{N}[n, k]} \quad (7)$$

The Mixture ($\hat{M}$) and Noise ($\hat{N}$) terms are short-time spectral magnitudes used to estimate the IRM for multiple frequency channels [k] in each analysis frame [n]. The resulting Ratio Mask RM[n, k] is a vector of frequency channel weights for each analysis frame. RM[n, k] can be computed directly using the STFTs of the signals from the microphone pair:

$$RM[n, k] = \frac{|X_1[n, k]| + |X_2[n, k]| - |X_1[n, k] - X_2[n, k]|}{|X_1[n, k] + X_2[n, k]|} \quad (8)$$

A Binary Mask BM[n, k] may also be computed using a thresholding function, with threshold value $\psi$, which may be set to a fixed value of $\psi = 0.2$ for example:

$$BM[n, k] = \begin{cases} 1 & \text{if } RM[n, k] \geq \psi \\ 0 & \text{if } RM[n, k] < \psi \end{cases} \quad (9)$$

Figure 5:
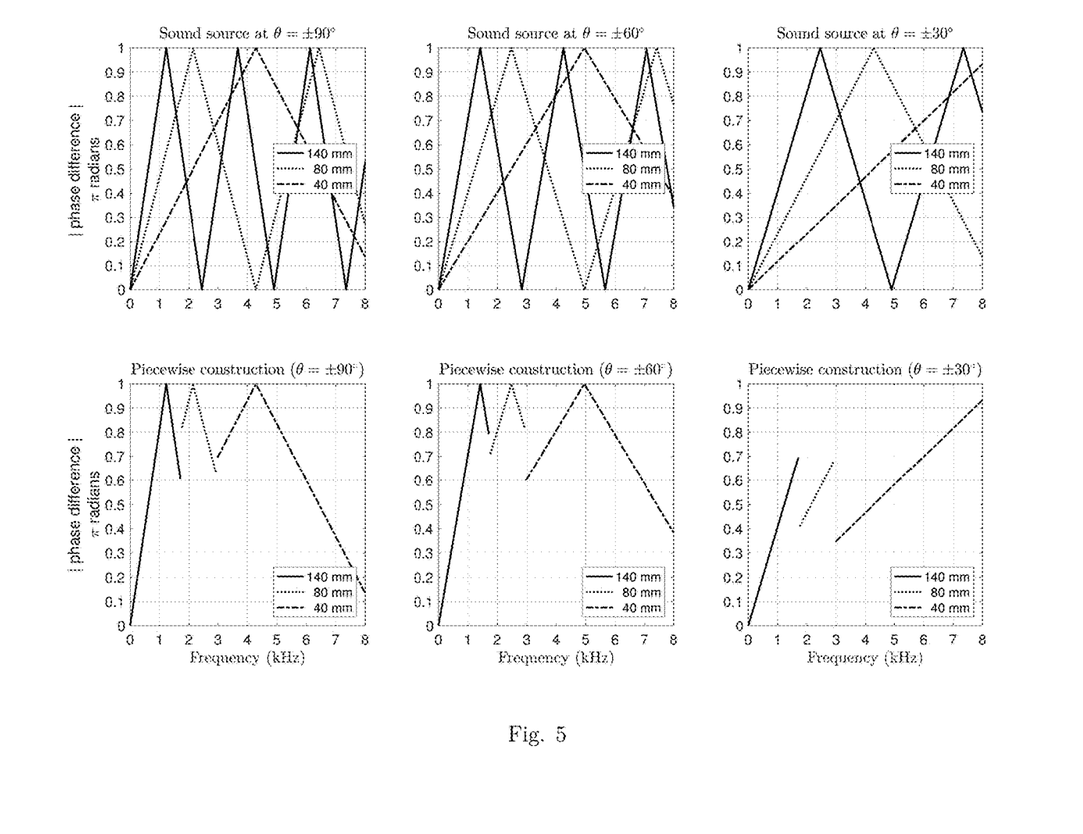
FIG. 5 is a plot of phase separations for microphone pairs of an ALD.

FIG. 5 illustrates one aspect of the disclosed technique, namely addressing the problem of "null phase differences" that impair performance within certain frequencies for any one pair of microphones. The top panel illustrates the phase separations of the three pairs of microphones across the frequency range of 0 to 8 kHz, and for three different interfering sound source directions (30°, 60° and 90°). For each microphone pair with respective intra-pair microphone spacing, there are frequencies at which there is little to no phase difference, such that target cancellation based on phase differences cannot be effectively implemented. The disclosed technique employs multiple microphone pairs, with varied spacings, to address this issue.

In the illustrated example, three microphone pairs having respective distinct spacings (e.g. 140, 80 and 40 mm) are used, and their outputs are combined via "piecewise construction", as illustrated in the bottom panel of FIG. 5; i.e., combined in a manner that provides positive absolute phase differences for the STTC processing to work with in the 0-8 kHz band that is most important for speech intelligibiility. In particular, this plot illustrates the "piecewise construction" approach to creating a chimeric Global Ratio Mask $RM_G$ from the individual Ratio Masks for the three microphone pairs ([1, 2], [3, 4], [5, 6]). This is described in additional detail below.

Figure 6:
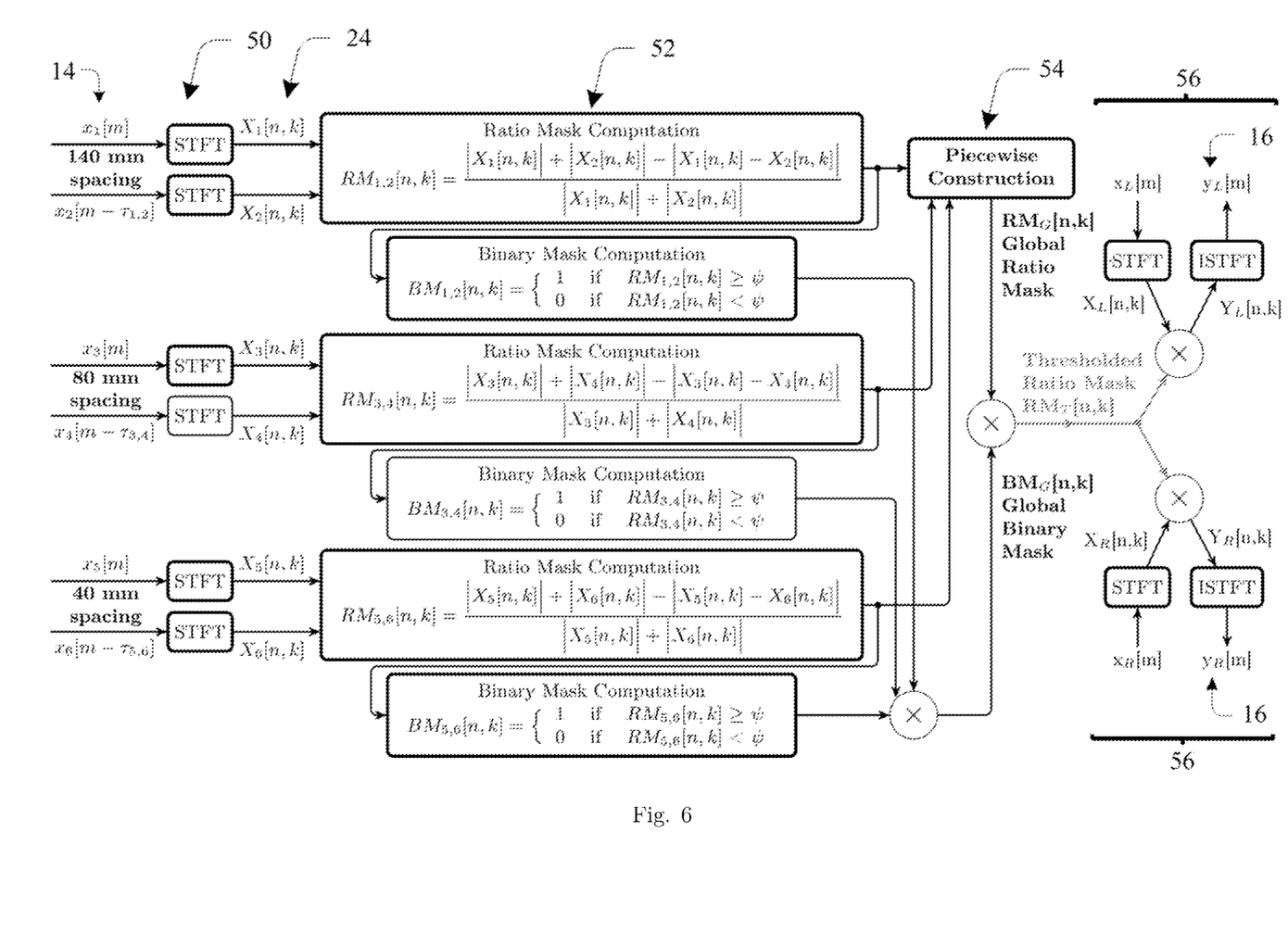
FIG. 6 is a block diagram of STTC processing for an ALD.

FIG. 6 is a block diagram of the STTC processing [20-1] (FIG. 3). Overall, it includes the following distinct stages of calculations:

1. Short-Time Fourier Transform (STFT) processing [50], converts each microphone signal into frequency domain signal
2. Ratio Mask (RM) and Binary Mask (BM) processing [52], applied to frequency domain signals of microphone pairs
3. Global Ratio Mask ($RM_G$) and Thresholded Ratio Mask ($RM_T$) processing [54], uses ratio masks of all microphone pairs
4. Output signal processing [56], uses the Thresholded Ratio Mask ($RM_T$) to scale/modify selected microphone signals to serve as output signal(s) [16]

The above stages of processing are described in further detail below.

1. STFT Processing [50]

Short-Time Fourier Transforms (STFTs) are continually calculated from frames of each input signal x[m] according to the following calculation:

$$X_i[n,k] = STFT\{x_i[m]\} = \sum_{m=-\infty}^{\infty} x_i[m]w[nH-m]e^{-j\frac{2\pi k}{F}m} \quad (10)$$

where i is the index of the microphone, w[n] is a finite-duration Hamming window; n and k are discrete indices for time and frequency, respectively; H is a temporal sampling factor (i.e., the Hop size between FFTs) and F is a frequency sampling factor (i.e., the FFT length).

2. STTC Processing [52]

Pairwise ratio masks RM, one for each microphone spacing (140, 80 and 40 mm) are calculated as follows; i.e., there is a unique RM for each pair of microphones ([1,2], [3,4], [5,6]):

$$RM_{1,2}[n,k] = \frac{|X_1[n,k]| + |X_2[n,k]| - |X_1[n,k] - X_2[n,k]|}{|X_1[n,k] + X_2[n,k]|} \quad (11a)$$

$$RM_{3,4}[n,k] = \frac{|X_3[n,k]| + |X_4[n,k]| - |X_3[n,k] - X_4[n,k]|}{|X_3[n,k] + X_4[n,k]|} \quad (11b)$$

$$RM_{5,6}[n,k] = \frac{|X_5[n,k]| + |X_6[n,k]| - |X_5[n,k] - X_6[n,k]|}{|X_5[n,k] + X_6[n,k]|} \quad (11c)$$

Pairwise Binary Masks BM are calculated as follows, using a thresholding function ψ, which in one example is a constant set to a relatively low value (0.2 on a scale of 0 to 1):

$$BM_{1,2}[n,k] = \begin{cases} 1 & \text{if } RM_{1,2}[n,k] \geq \psi \\ 0 & \text{if } RM_{1,2}[n,k] < \psi \end{cases} \quad (12a)$$

$$BM_{3,4}[n,k] = \begin{cases} 1 & \text{if } RM_{3,4}[n,k] \geq \psi \\ 0 & \text{if } RM_{3,4}[n,k] < \psi \end{cases} \quad (12b)$$

$$BM_{5,6}[n,k] = \begin{cases} 1 & \text{if } RM_{5,6}[n,k] \geq \psi \\ 0 & \text{if } RM_{5,6}[n,k] < \psi \end{cases} \quad (12c)$$

In the low frequency channels, a ramped binary mask threshold may be used for the most widely spaced microphone pair ($BM_{1,2}$) to address the issue of poor cancellation at these low frequencies. Thus at the lowest frequencies, where cancellation is least effective, a higher threshold is used. An example of such a ramped threshold is described below.

3. Global Ratio Mask ($RM_G$) and Thresholded Ratio Mask ($RM_T$) Processing [54]

As mentioned above, a piecewise approach to creating a chimeric Global Ratio Mask $RM_G$ from the individual Ratio Masks for the three microphone pairs ([1,2], [3,4], [5,6]) is used. In one example, the RMG is constructed, in a piecewise manner, thusly (see bottom panel of FIG. 5):

$$RM_G[n,1:32] = RM_{1,2}[n,1:32](\approx 0 \rightarrow 1500 \text{ Hz})$$

$$RM_G[n,33:61] = RM_{3,4}[n,33:61](\approx 1500 \rightarrow 3000 \text{ Hz})$$

$$RM_G[n,62:F/2] = RM_{5,6}[n,62:F/2](\approx 3000 \rightarrow F_s/2 \text{ Hz})$$

The illustration of piecewise selection of discrete frequency channels (k) shown above is for a sampling frequency ($F_s$) of 50 kHz and an FFT size (F) of 1024 samples; the discrete frequency channels used will vary according to the specified values of $F_s$ and F. The piecewise-constructed Global Ratio Mask $RM_G$ is also given conjugate symmetry (i.e. negative frequencies are the mirror image of positive frequencies) to ensure that the STTC processing yields a real (rather than complex) output. Additional detail is given below.

A singular Global Binary Mask $BM_G$ is computed from the three Binary Masks ($BM_{1,2}$, $BM_{3,4}$, $BM_{5,6}$), where x specifies element-wise multiplication:

$$BM_G[n,k] = BM_{1,2}[n,k] \times BM_{3,4}[n,k] \times BM_{5,6}[n,k] \quad (13)$$

Multiplication of the Global Ratio Mask $RM_G$ with the Global Binary Mask $BM_G$ yields a Thresholded Ratio Mask $RM_T[n,k]$ that is used for reconstruction of the target signal in the output signal processing [56], as described below. Note that $RM_T[n,k]$ has weights of 0 below the threshold ψ and continuous "soft" weights at and above ψ.

The Global Ratio Mask ($RM_G$), the Global Binary Mask ($BM_G$) and the Thresholded Ratio Mask ($RM_T$) are all effective time-varying filters, with a vector of frequency channel weights for every analysis frame. Any one of the three (i.e., $RM_G$, $BM_G$ or $RM_T$) can provide an intelligibility benefit for a target talker, and supress both stationary and non-stationary interfering sound sources. $RM_T$ is seen as the most desirable, effective and useful of the three; hence it is used for producing the output in the block diagram shown in FIG. 6.

4. Output Signal Processing [56]

The output signal(s) may be either stereo or monaural ("mono"), and these are created in correspondingly different ways as explained below.

Reconstruction of Target Signal with STEREO Output

Stereo output may be used, for example in applications such as ALD where it is important to preserve binaural cues such as ILD, ITD. The output of the STTC processing is an estimate of the target speech signal from the specified look direction. The Left and Right (i.e. stereo pair) Time-Frequency domain estimate ($Y_L[n,k]$ and $Y_R[n,k]$) of the target speech signal ($y_L[m]$ and $y_R[m]$) can be described thusly, where $X_L$ and $X_R$ are the Short Time Fourier Transforms (STFTs) of the signals $x_L$ and $x_R$, from the designated Left and Right in-ear or near-ear microphones [44] (FIG. 4), and the Thresholded Ratio Mask $RM_T[n,k]$ is the conjugate-symmetric mask (i.e. the set of short-time weights for all frequencies, both positive and negative) computed in the mask processing [54] as described above:

$$Y_L[n,k] = RM_T[n,k] \times X_L[n,k] Y_R[n,k] = RM_T[n,k] \times X_R[n,k] \quad (14)$$

Alternatively, the Global Ratio Mask (RM$_G$) could be used to produce the stereo output:

$$Y_L[n,k]=RM_G[n,k] \times X_L[n,k] \quad Y_R[n,k]=RM_G[n,k] \times X_R[n,k] \quad (15)$$

Synthesis of a stereo output (y$_L$[m] and y$_R$[m]) estimate of the target speech signal consists of taking the Inverse Short Time Fourier Transforms (ISTFTs) of Y$_L$[n, k] and Y$_R$[n, k] and using the overlap-add method of reconstruction.

While the Global Binary Mask BM$_G$ could also be used to produce the stereo output, the continuously valued frequency channel weights of the RM$_G$ and RM$_T$ are more desirable, yielding superior performance in speech intelligibility and speech quality performance than the BM$_G$. RM$_T$ is seen as the most desirable, effective and useful of the three; hence it is used for producing the output in the block diagram shown in FIG. 6. However, an effective system for enchancing speech intelligibility could be built using only RM$_G$, hence the claim section builds upon a system that uses RM$_G$ to filter the output of the assistive listening device.

Reconstruction of Target Signal with MONO Output

A mono output (denoted below with the subscript M) may be used in other applications in which the preservation of binaural cues is absent or less important. In one example, a mono output can be computed via an average of the STFTs across multiple microphones, where I is the total number of microphones:

$$X_M[n,k] = \frac{\sum_{i=1}^{I} X_i[n,k]}{I} \quad (16)$$

$$Y_M[n,k] = RM_T[n,k] \times X_M[n,k] \quad (17)$$

Alternatively, the Global Ratio Mask (RM$_G$) could be used to produce the mono output:

$$Y_M[n,k]=RM_G[n,k] \times X_M[n,k] \quad (18)$$

The Mono output y$_M$[m] is produced by taking Inverse Short Time Fourier Transforms (ISTFT) of Y$_M$[n, k] and using the overlap-add method of reconstruction.

Steering the Nonlinear Beamformer's "Look" Direction

The default target sound source "look" direction is "straight ahead" at 0°. However, if deemed necessary or useful, an eyetracker could be used to specify the "look" direction, which could be "steered" via τ time shifts, implemented in either the time or frequency domains, of the Left and Right signals. The STTC processing could boost intelligibility for the target talker from the designated "look" direction and suppress the intelligibility of the distractors, all while preserving binaural cues for spatial hearing.

The τ sample shifts are computed independently for each pair of microphones, where F$_s$ is the sampling rate, d is the inter-microphone spacing in meters, λ is the speed of sound in meters per second and θ is the specified angular "look" direction in radians:

$$\tau_{[1,2]} = \left\lfloor f_s \times \frac{d_{[1,2]}}{\lambda} \sin(\theta) \right\rfloor \quad (19a)$$

$$\tau_{[3,4]} = \left\lfloor f_s \times \frac{d_{[3,4]}}{\lambda} \sin(\theta) \right\rfloor \quad (19b)$$

$$\tau_{[5,6]} = \left\lfloor f_s \times \frac{d_{[5,6]}}{\lambda} \sin(\theta) \right\rfloor \quad (19c)$$

These τ time shifts are used both for the computation of the Ratio Masks (RMs) as well as for steering the beamformer used for the Mono version of the STTC processing.

Figure 7:
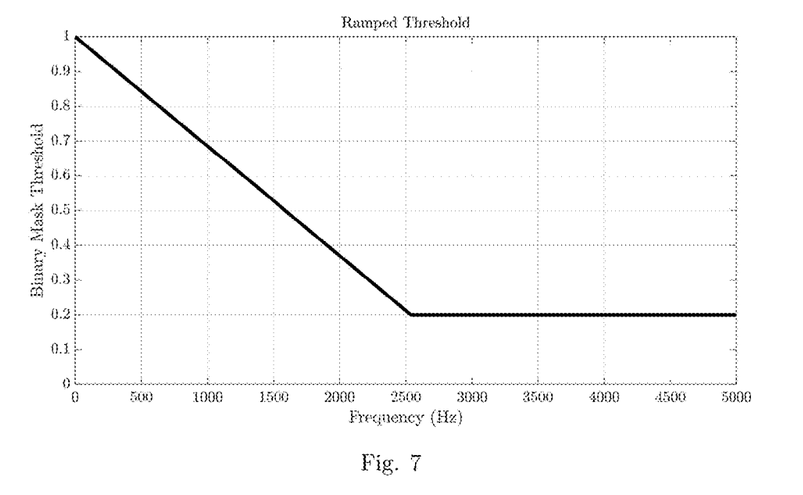
FIG. 7 is a plot for a ramped threshold used in STTC processing.

FIG. 7 shows an example ramped threshold used to compute the Binary Mask BM$_{1,2}$ for the most widely spaced pair of microphones, as mentioned above. For frequencies below 2500 Hz, the threshold ramps linearly. This ramped threshold for the 6-microphone array is somewhat more aggressive than might be used in other embodiments, for example with an 8-microphone array as described below. The use of a ramped threshold improves cancellation performance for distractors located at off-axis angles of approximately 30°.

Figure 8:
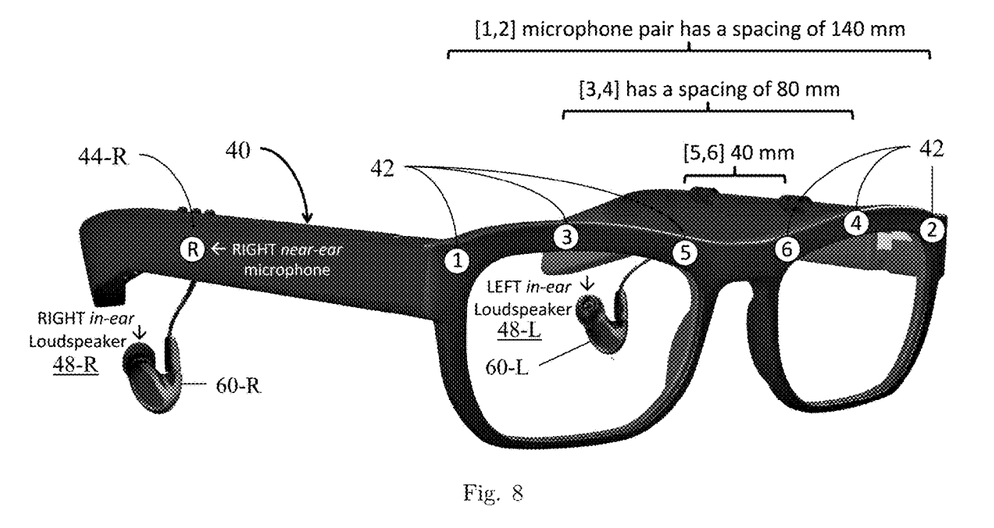
FIG. 8 is a depiction of a specialized eyeglass frame incorporating components of an ALD according to an alternative arrangement.

FIG. 8 illustrates an alternative physical realization in which the near-ear micron phones [44] are located on the temple pieces of the frame [40] rather than in the earbuds [60]. FIG. 8 shows only the right near-ear microphone [44-R]; a similar placement on the left temple piece is used for the left near-ear microphone [44-L].

An STTC ALD as described herein can improve speech intelligibility for a target talker while preserving Interaural Time Difference (ITD) and Interaural Level Difference (ILD) binaural cues that are important for spatial hearing. These binaural cues are not only important for effecting sound source localization and segregation, they are important for a sense of Spatial Awareness. While the processing described herein aims to eliminate the interfering sound sources altogether, the user of the STTC ALD device could choose whether to listen to the unprocessed waveforms at the Left and Right near-ear microphones, the processed waveforms, or some combination of both. The binaural cues that remain after filtering with the Time-Frequency (T-F) mask are consistent with the user's natural binaural cues, which allows for continued Spatial Awareness with a mixture of the processed and unprocessed waveforms. The ALD user might still want to hear what is going on in the surroundings, but will be able to turn the surrounding interferring sound sources down to a comfortable and ignorable, rather than distracting, intrusive and overwhelming, sound level. For example, in some situations, it would be helpful to be able to make out the speech of surrounding talkers, even though the ALD user is primarily focused on listening to the person directly in front of them.

II. System Description of 8-Microphone Short-Time Target Cancellation (STTC) Human-Computer Interface (HCI)

FIGS. 9-13 show a second embodiment of a computerized realization using 8 microphones. The STTC processing serves as a front end to a computer hearing application such as automatic speech recognition (ASR). Because much of the processing is the same or similar as that of a 6-microphone system as described above, the description of FIGS. 9-13 is limited to highlighting the key differences from corresponding aspects of the 6-microphone system.

Figure 9:
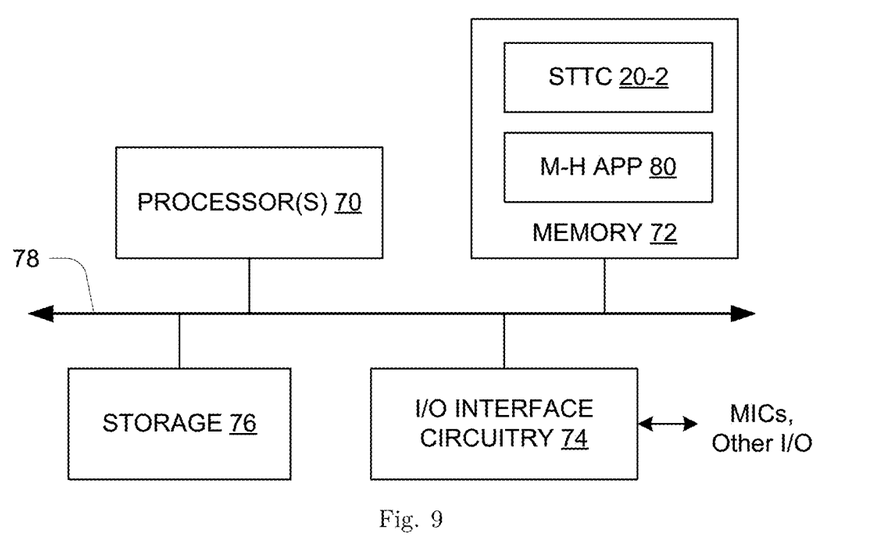
FIG. 9 is a block diagram of circuitry of a computerized device incorporating STTC processing for human-computer interface (HCI)

FIG. 9 is a block diagram of a specialized computer that realizes the STTC functionality. It includes one or more processors [70], primary memory [72], I/O interface circuitry [74], and secondary storage [76] all interconnected by high-speed interconnect [78] such as one or more high-bandwidth internal buses. The I/O interface circuitry [74] interfaces to external devices including the input microphones, perhaps through integral or non-integral analog-todigital converters. In operation, the memory [72] stores computer program instructions of application programs as well as an operating system, as generally known. In this case, the application programs include STTC processing [20-2] as well as a machine hearing application (M-H APP) [80]. The remaining description focuses on structure and operation of the STTC processing [20-2], which generates noise-reduced output audio signals [16] (FIG. 1) supplied to the machine hearing application [80].

Figure 10:
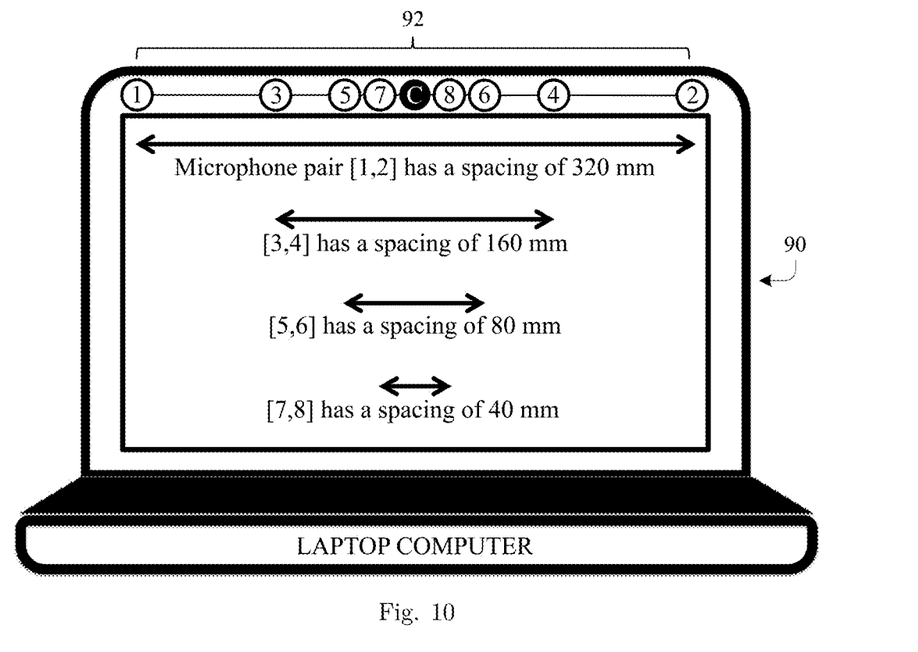
FIG. 10 is a depiction of a specialized computer incorporating microphone pairs for STTC processing.

FIG. 10 shows a physical realization of a computer structured according to FIG. 9, in this case in the form of a laptop computer [90] having an array of eight microphones [92] integrated into an upper part of its casing as shown. The four pairs ([1, 2], [3, 4], [5, 6], [7, 8]) of microphones have respective distinct spacings of 320, 160, 80 and 40 mm, respectively.

Figure 11:
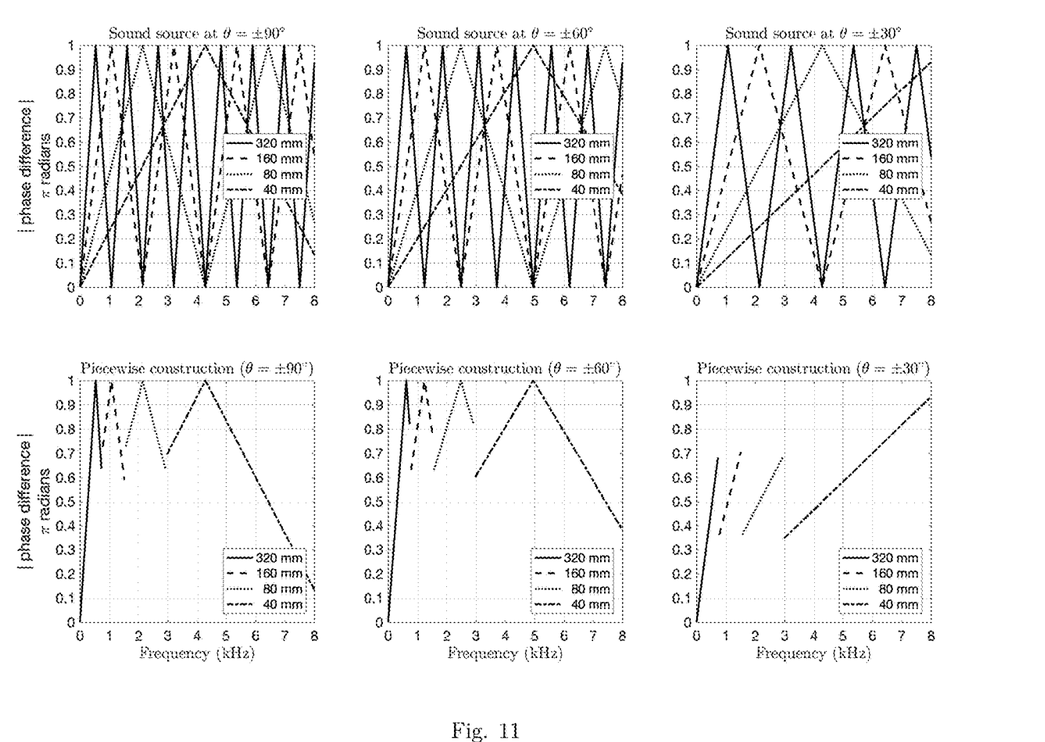
FIG. 11 is a plot of phase separations for microphone pairs of a specialized computer such as that of FIG. 10.

FIG. 11 is a set of plots of phase separations for the 8-microphone array, analogous to that of FIG. 5 for the 6-microphone array. The bottom panel illustrates a piecewise approach to creating the Global Ratio Mask $RM_G$ from the individual Ratio Masks for the four microphone pairs ([1, 2], [3, 4], [5, 6], [7, 8]). This is described in additional detail below.

Figure 12:
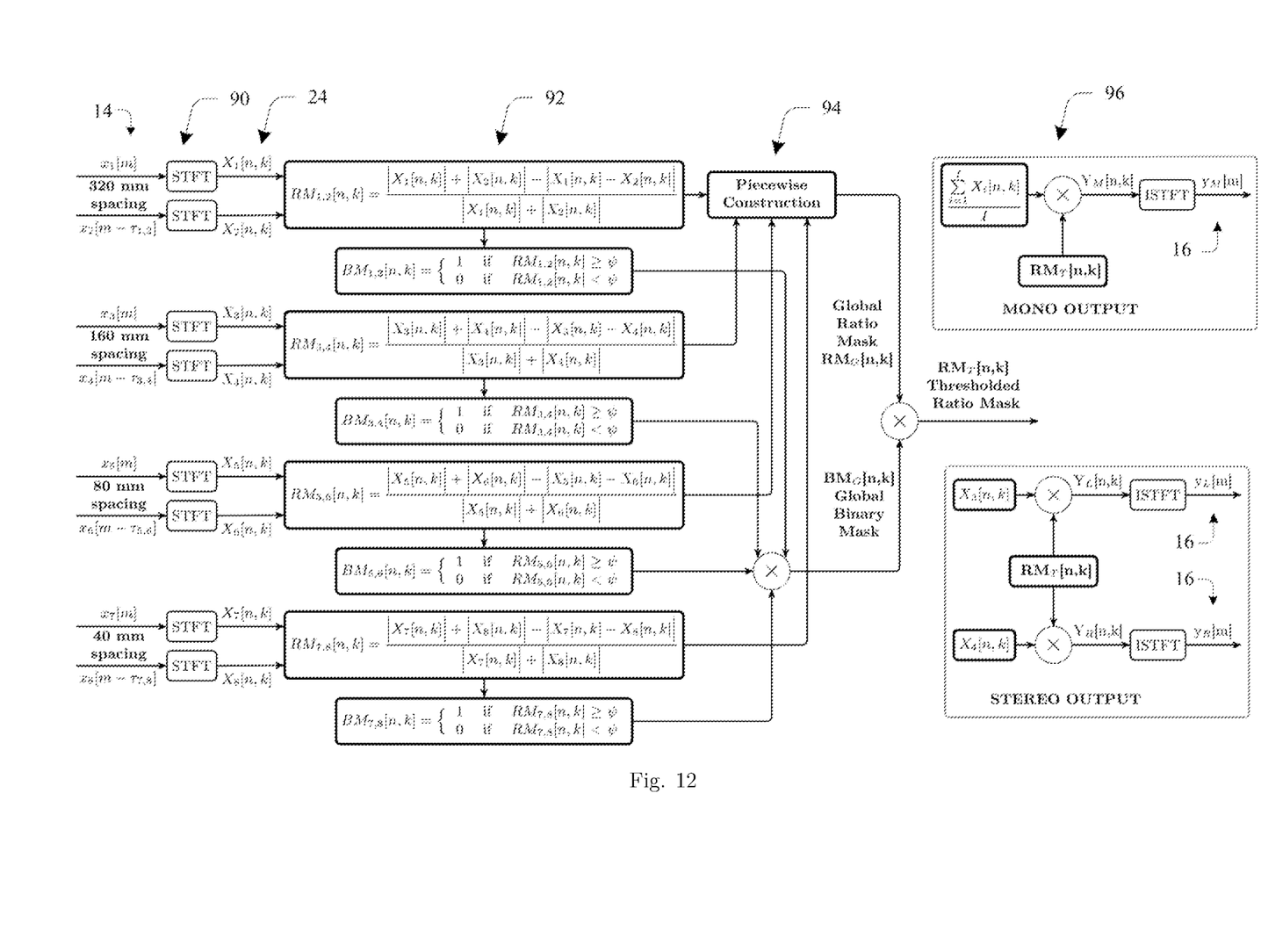
FIG. 12 is a block diagram of STTC processing for a computerized device such as that of FIG. 9.

FIG. 12 is a block diagram of the STTC processing [20-2] (FIG. 9), analogous to FIG. 6 described above. It includes the following distinct stages of calculations, similar to the processing of FIG. 6 except for use of four rather than three microphone pairs:
1. Short-Time Fourier Transform (STFT) processing [90], converts each microphone signal into frequency domain signal. 2. Ratio Mask (RM) and Binary Mask (BM) processing [92], applied to frequency domain signals of microphone pairs. 3. Global Ratio Mask ($RM_G$) and Thresholded Ratio Mask ($RM_T$) processing [94], uses ratio masks of all microphone pairs. 4. Output signal processing [96], uses the Thresholded Ratio Mask ($RM_T$) to scale/modify selected microphone signals to serve as output signal(s) [16].

In the STFT processing [90], individual STFT calculations [90] are the same as above. Two additional STFTs are calculated for the 4th microphone pair (7,8). In the RM processing [92], a fourth $RM_{7,8}$ is calculated for the fourth microphone pair:

$$RM_{1,2}[n, k] = \frac{|X_1[n, k]| + |X_2[n, k]| - |X_1[n, k] - X_2[n, k]|}{|X_1[n, k] + X_2[n, k]|} \quad (20a)$$

$$RM_{3,4}[n, k] = \frac{|X_3[n, k]| + |X_4[n, k]| - |X_3[n, k] - X_4[n, k]|}{|X_3[n, k] + X_4[n, k]|} \quad (20b)$$

$$RM_{5,6}[n, k] = \frac{|X_5[n, k]| + |X_6[n, k]| - |X_5[n, k] - X_6[n, k]|}{|X_5[n, k] + X_6[n, k]|} \quad (20c)$$

$$RM_{7,8}[n, k] = \frac{|X_7[n, k]| + |X_8[n, k]| - |X_7[n, k] - X_8[n, k]|}{|X_7[n, k] + X_8[n, k]|} \quad (20d)$$

Also, as shown in the bottom panel of FIG. 11, piecewise construction of the global ratio mask $RM_G$ uses the four RMs as follows (using $F_s=50$ kHz and $F=1024$ for the examples herein):

$$RM_G[n,1:16]=RM_{1,2}[n,1:16] (\approx 0 \to 750 \text{ Hz})$$

$$RM_G[n,17:32]=RM_{3,4}[n,17:32] (\approx 750 \to 1500 \text{ Hz})$$

$$RM_G[n,33:61]=RM_{5,6}[n,33:61] (\approx 1500 \to 3000 \text{ Hz})$$

$$RM_G\left[n, 62:\frac{F}{2}\right] = RM_{7,8}\left[n, 62:\frac{F}{2}\right] \left(\approx 3000 \to \frac{F_S}{2} \text{ Hz}\right)$$

Similarly, the pairwise BM calculations include calculation of a fourth Binary Mask, $BM_{7,8}$, for the fourth microphone pair [7, 8]:

$$BM_{1,2}[n, k] = \begin{cases} 1 & \text{if } RM_{1,2}[n, k] \geq \psi \\ 0 & \text{if } RM_{1,2}[n, k] < \psi \end{cases} \quad (21a)$$

$$BM_{3,4}[n, k] = \begin{cases} 1 & \text{if } RM_{3,4}[n, k] \geq \psi \\ 0 & \text{if } RM_{3,4}[n, k] < \psi \end{cases} \quad (21b)$$

$$BM_{5,6}[n, k] = \begin{cases} 1 & \text{if } RM_{5,6}[n, k] \geq \psi \\ 0 & \text{if } RM_{5,6}[n, k] < \psi \end{cases} \quad (21c)$$

$$BM_{7,8}[n, k] = \begin{cases} 1 & \text{if } RM_{7,8}[n, k] \geq \psi \\ 0 & \text{if } RM_{7,8}[n, k] < \psi \end{cases} \quad (21d)$$

And the Global Binary Mask $BM_G$ uses all four BMs:

$$BM_G[n,k]=BM_{1,2}[n,k] \times BM_{3,4}[n,k] \times BM_{5,6}[n,k] \times BM_{7,8}[n,k] \quad (22)$$

Figure 13:
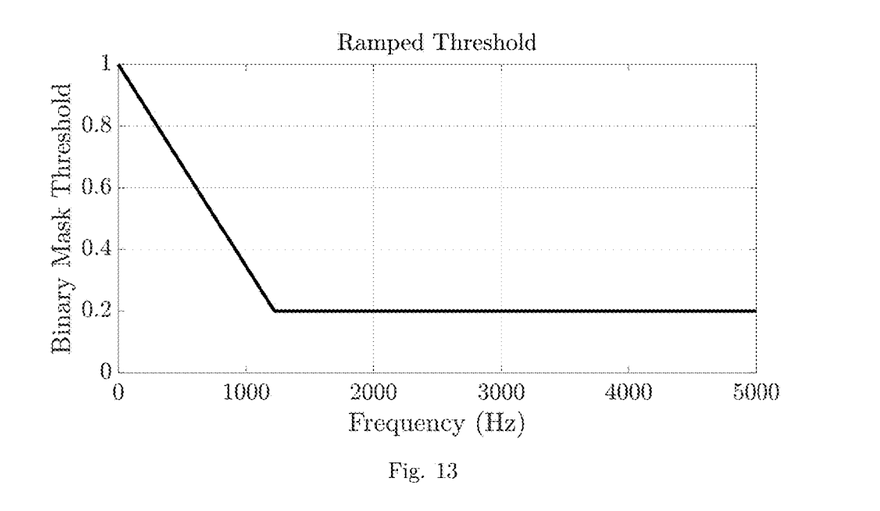
FIG. 13 is a plot for an alternative ramped threshold used in STTC processing.

FIG. 13 shows the less aggressively ramped threshold used for the BM calculations. For frequencies below 1250 Hz, the threshold ramps linearly.

For the Output Signal Reconstruction [96], both stereo and mono alternatives are possible. These are generally similar to those of FIG. 6, except that the stereo version filters the signals from the third microphone pair (3,4). The mono version combines the outputs of all eight microphone signals:

$$X_M[n, k] = \frac{\sum_{i=1}^{I} X_i[n, k]}{I} \quad (23)$$

$$Y_M[n, k] = RM_T[n, k] \times X_M[n, k] \quad (24)$$

Alternative Computation of the Global Ratio Mask

Two alternatives are described: (1) taking the minimum ("min") of pairwise masks, and (2) combining the "min" and "piecewise" approaches.
1. Taking the Minimum of Pairwise Masks As an alternative to calculating the Global Ratio Mask ($RM_G$) from the pair-wise ratio masks through "piecewise" construction, it can be calculated by taking the minimum value, at each Time-Frequency (T-F) tile position [n, k], across the pair-wise ratio masks, as described in the equations below for the six and eight microphone arrays, respectively:

For six microphones:

$$RM_G[n,k]=\min(RM_{1,2}[n,k],RM_{3,4}[n,k],RM_{5,6}[n,k]) \quad (25)$$

For eight microphones:

$$RM_G[n,k]=\min(RM_{1,2}[n,k],RM_{3,4}[n,k],RM_{5,6}[n,k],RM_{7,8}[n,k]) \quad (26)$$

There may be advantages to this alternative approach to computing the Global Ratio Mask, such as better sound source segregation and speech quality when the interfering sources are in close proximity to the target talker (i.e. 30° as opposed to 90° angular separation).

2. Combining the "Min" and "Piecewise" Approaches

The "min" approach described above may give improved performance when the microphone array is lined up perfectly with the target, but may set high-frequency T-F tiles to values of zero when the array is not looking directly at the target (i.e. the target is off to the left or right by a few degrees). For this situation an effective approach might involve combining the "min" and "piecewise" approaches to ensure that the most widely spaced microphone pair is not included in the computation of the high-frequency T-F tiles. An example of combining the "min" and "piecewise" approaches to compute "low" (0 to 1025 Hz), "mid" (1074 to 2490 Hz) and "high" frequency segments of the Global Ratio Mask ($RM_G$) is shown below:

For Low Frequency Channels (0 to 1025 Hz):

$$RM_G[n,1:22]=\min(RM_{1,2}[n,1:22],RM_{3,4}[n,1:22]) \quad (27a)$$

For Mid Frequency Channels (1074 to 2490 Hz):

$$RM_G[n,23:52]=\min(RM_{1,2}[n,23:52],RM_{3,4}[n,23:52],RM_{5,6}[n,23:52]) \quad (27b)$$

For High Frequency Channels (2539 to 25000 Hz):

$$RM_G\left[n, 53:\frac{F}{2}\right] = \min\left(RM_{3,4}\left[n, 53:\frac{F}{2}\right], RM_{5,6}\left[n, 53:\frac{F}{2}\right]\right) \quad (27c)$$

Note that the most widely spaced microphone pair, $RM_{1,2}$ is not included in the computation of the high frequency channel (2539 to 25000 Hz) T-F tiles. This processing should alleviate deletion of high-frequency target T-F tiles when the target is slightly off axis (i.e. a few degrees to the left or right of the array's designated "look" direction.

Piecewise-Construction of Global Binary Mask

For a scenario in which the ALD's 6-microphone array has a straight-ahead "look" direction of 0°, but the target talker is at +5°, the Time-Frequency (T-F) tiles above 3.5 kHz may be set to zero, a result of the target waveform becoming part of the "Noise" estimate in the most widely spaced pair of microphones. Having the T-F tiles above 3.5 kHz set to zero does not affect the speech intelligibility metrics because the frequencies most important for speech are below that cutoff; e.g., telephones transmit speech bandpass filtered between 300 Hz and 3.5 kHz. However, if it is desired to preserve this high-frequency speech content, a piecewise construction approach could be used for computing the Global Binary Mask ($BM_G$). Rather than using the above element-by-element multiplication, a piecewise construction such as the following can be used:

For Low to Mid Frequency Channels 0 to 2500 Hz):

$$BM_G[n,1:52]=BM_{1,2}[n,1:52]\times BM_{3,4}[n,1:52] \quad (28a)$$

For Mid to High Frequency Channels 2500 to 25000 Hz):

$$BM_G\left[n, 53:\frac{F}{2}\right] = BM_{3,4}\left[n, 53:\frac{F}{2}\right], BM_{5,6}\left[n, 53:\frac{F}{2}\right] \quad (28b)$$

Embodiment in a 2-Microphone Binaural Hearing Aid.

Although the devices described thus far have leveraged multiple microphone pairs to compute an effective time-varying filter that can suppress non-stationary sound sources, the approach could also be used in binaural hearing aids using only two near-ear microphones [44], as shown in FIG. 4. While the overall performance would not be comparable to that of the six microphone implementation, a two microphone implementation would indeed still provide a speech intelligibility benefit, albeit only for a "straight ahead" look direction of 0°; i.e., the "look" direction would not be steerable. Because much of the processing is the same or similar as that of the 6-microphone assistive listening device described earlier, the description below is limited to highlighting the key differences when using only one pair of binaural in-ear microphones.

Figure 14:
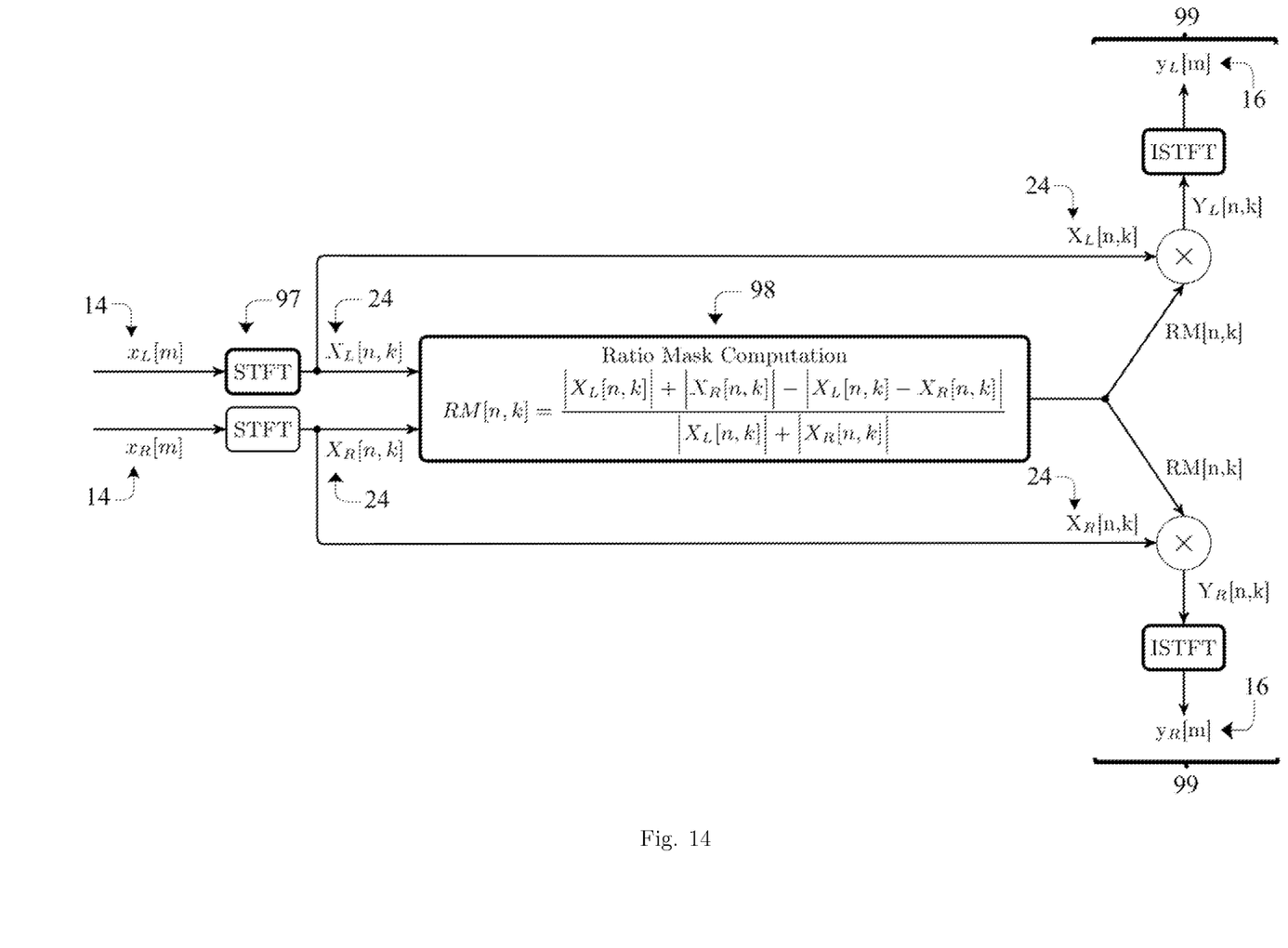
FIG. 14 is a block diagram of STTC processing for a binaural hearing aid.

FIG. 14 is a block diagram of minimalist STTC processing for a single pair of binaural in-ear (or near-ear) microphones [44]. It includes the following distinct stages of calculations, similar to the processing of FIG. 6 except for the use of only one, rather than three, microphone pairs: 1. Short-Time Fourier Transform (STFT) processing [97], converts each microphone signal into frequency domain signal. 2. Ratio Mask (RM) processing [98], applied to frequency domain signals of the microphone pair. 3. Output signal processing [99], uses the ratio mask RM to scale/modify the binaural input signals to serve as binaural output signal(s) [16].

The STTC processing [98] would use only the signals from the binaural microphones, the Left and Right STFTs $X_L[n,k]$ and $X_R[n,k]$ [24], to compute a Ratio Mask (RM):

$$RM[n,k] = \frac{|X_L[n,k]| + |X_R[n,k]| - |X_L[n,k] - X_R[n,k]|}{|X_L[n,k] + X_R[n,k]|} \quad (29)$$

If there is only one pair of microphones, and therefore only one Ratio Mask (RM) is computed, then the Global Ratio Mask ($RM_G$) and the single Ratio Mask (RM) are equivalent; i.e., $RM_G[n,k]=RM[n,k]$.

For the output signal reconstruction [99], the $RM_G[n,k]$ T-F mask (i.e., time-varying filter) can be used to filter the signals from the Left and Right near-ear microphones [44]:

$$Y_L[n,k]=RM_G[n,k]\times X_L[n,k] \quad Y_R[n,k]=RM_G[n,k]\times X_R[n,k] \quad (30)$$

Synthesis of a stereo output ($y_L[m]$ and $y_R[m]$) estimate of the target speech signal consists of taking the Inverse Short Time Fourier Transforms (ISTFTs) of $Y_L[n,k]$ and $Y_R[n,k]$ and using the overlap-add method of reconstruction. The minimalist processing described here would provide a speech intelligibility benefit, for a targer talker "straight ahead" at 0°, while still preserving binaural cues. Alternative processing might include using a Thresholded Ratio Mask ($RM_T$), as described in the previous sections, for computing the outputs $Y_L$ and $Y_R$.

A Binary Mask BM[n,k] may also be computed using a thresholding function, with threshold value $\psi$, which may be set to a fixed value of $\psi=0.2$ for example:

$$BM[n,k] = \begin{cases} 1 & \text{if } RM[n,k] \geq \psi \\ 0 & \text{if } RM[n,k] < \psi \end{cases} \quad (31)$$

When using only one pair of microphones, the Thresholded Ratio Mask ($RM_T$) is the product of the Ratio Mask and Binary Mask:

$$RM_T[n,k]=RM[n,k]\times BM[n,k] \quad (32)$$

For this alternative processing for the output signal reconstruction [99], when using only one pair of microphones, the $RM_T[n,k]$ T-F mask (i.e., time-varying filter) can be used to filter the signals from the Left and Right near-ear microphones [44]:

$$Y_L[n,k]=RM_T[n,k]\times X_L[n,k] \quad Y_R[n,k]=RM_T[n,k]\times X_R[n,k] \quad (33)$$

While various embodiments of the invention have been particularly shown and described, it will be understood by those skilled in the art that various changes in form and details may be made therein without departing from the spirit and scope of the invention as defined by the appended claims.

What is claimed:

1. An assistive listening device for use in the presence of stationary interfering sound sources and/or non-stationary interfering sound sources, comprising
an array of microphones arranged into a set of microphone pairs positioned about an axis with respective distinct intra-pair microphone spacings, each microphone of the array of microphones generating a respective audio input signal;
a pair of ear-worn loudspeakers; and
audio circuitry configured to compute a set of time-varying filters, for real-time speech intelligibility enhancement, using causal and memoryless frame-by-frame processing, comprising (1) applying a short-time frequency transform to each of the respective audio input signals, thereby converting the respective time domain signals into respective frequency-domain signals for every short-time analysis frame, (2) calculating a pairwise noise estimate by first subtracting the respective frequency-domain signals from a microphone pair and thereafter taking the magnitude of the difference, (3) calculating a pairwise mixture estimate by first taking the magnitudes of the respective frequency domain signals from a microphone pair, and thereafter adding the respective magnitudes and (4) calculating a pairwise ratio mask from the pairwise noise estimate and the pairwise mixture estimate for each of the respective microphone pairs, wherein the calculation of the pairwise ratio mask includes the aforementioned frequency-domain subtraction of signals, (5) calculating a global ratio mask, which is an effective time-varying filter with a vector of frequency channel weights for every short-time analysis frame, from the set of pairwise ratio masks, with the frequency channels from each pairwise ratio mask chosen according to the frequency range(s) for which the distinct intra-pair microphone spacing provides a positive absolute phase difference; wherein when using only one pair of microphones, the singular pairwise ratio mask and the global ratio mask are equivalent, and (6) applying the global ratio mask, or a post-processed variant thereof, and inverse short-time frequency transforms, to selected ones of the frequency-domain signals, or to the frequency-domain output of a beamformer, thereby suppressing both the stationary and the non-stationary interfering sound sources in real-time and generating an audio output signal for driving the loudspeakers.

2. The assistive listening device of claim 1, wherein the array of microphones includes a set of one or more pairs of microphones with predetermined intra-pair microphone spacings.

3. The assistive listening device of claim 1, wherein the array of microphones are arranged on a head-worn frame worn by a user.

4. The assistive listening device of claim 3, wherein the head-worn frame is an eyeglass frame.

5. The assistive listening device of claim 4, wherein the microphones are arranged across a front of the eyeglass frame.

6. The assistive listening device of claim 4, wherein the array of microphones includes microphones disposed on temple pieces of the eyeglass frames.

7. The assistive listening device of claim 1, wherein the array of microphones includes in-ear or near-ear microphones whose corresponding frequency-domain signals are the selected frequency-domain signals to which the global ratio mask and inverse short-time frequency transforms are applied.

8. The assistive listening device of claim 1, wherein the short-time target cancellation processing comprises calculating pairwise binary masks from the frequency-domain signals of respective microphone pairs, and wherein a global binary mask is calculated from the pair-wise binary masks.

9. The assistive listening device of claim 8, wherein the pairwise binary masks are calculated by applying a threshold value to respective ratio masks.

10. The assistive listening device of claim 9, wherein for frequency channels below a predetermined frequency, a ramped threshold value is used for a most widely spaced microphone pair to account for reduced cancellation at frequencies below the predetermined frequency.

11. The assistive listening device of claim 10, wherein the global ratio mask and global binary mask are used to calculate a thresholded ratio mask, which has the global binary mask's zero values below a specified threshold, and the global ratio mask's continuous values above said threshold. The thresholded ratio mask, and inverse short-time frequency transforms, are applied to selected ones of the frequency-domain signals, thereby suppressing both the stationary and the non-stationary interfering sound sources and generating an audio output signal for driving the loudspeakers.

12. The assistive listening device of claim 11, wherein the array of microphones includes in-ear or near-ear microphones whose corresponding frequency-domain signals are the selected frequency-domain signals to which the thresholded ratio mask and inverse short-time frequency transforms are applied.

13. A machine hearing device for generating speech signals to be used in identifying semantic content in the presence of stationary interfering sound sources and/or non-stationary interfering sound sources, and thereby allowing the performance of automated actions by related systems in response to the identified semantic content, the hearing device comprising:
a set of microphones generating respective audio input signals arranged in an array having a set of microphone pairs arranged about an axis with pre-determined intra-pair microphone spacings; and
audio circuitry configured to compute a set of time-varying filters, for real-time speech intelligibility enhancement, using causal and memoryless frame-by-frame processing, comprising (1) applying a short-time frequency transform to each of the respective audio input signals, thereby converting the respective time domain signals into respective frequency-domain signals for every short-time analysis frame, (2) calculating a pairwise noise estimate by first subtracting the respective frequency-domain signals from a microphone pair and thereafter taking the magnitude of the difference, (3) calculating a pairwise mixture estimate by first taking the magnitudes of the respective frequency domain signals from a microphone pair, and thereafter adding the respective magnitudes and (4) calculating a pairwise ratio masks from the pairwise noise estimate and the pairwise mixture estimate for each of the respective microphone pairs, wherein the calculation of the pairwise ratio mask includes the aforementioned frequency-domain subtraction of signals, (5) calculating a global ratio mask, which is an effective time-varying filter with a vector of frequency channel weights for every short-time analysis frame, from the set of pairwise ratio masks, with the frequency channels from each pairwise ratio mask chosen according to the frequency range(s) for which the distinct intra-pair microphone spacing provides a positive absolute phase difference; wherein when using only one pair of microphones, the singular pairwise ratio mask and the global ratio mask are equivalent, and (6) applying the global ratio mask, or a post-processed variant thereof, and inverse short-time frequency transforms, to selected ones of the frequency-domain signals, or to the frequency-domain output of a beamformer, thereby suppressing both the stationary and the non-stationary interfering sound sources in real-time and allowing for identification of the target speech signal.

14. The machine hearing device of claim 13, wherein the array of microphones includes a set of one or more pairs of microphones with predetermined intra-pair microphone spacings.

15. The machine hearing device of claim 13, wherein the short-time target cancellation processing comprises calculating pairwise binary masks from the frequency-domain signals of respective microphone pairs, and wherein a global binary mask is calculated from the pair-wise binary masks.

16. The machine hearing device of claim 15, wherein the pairwise binary masks are calculated by applying a threshold value to respective ratio masks.

17. The machine hearing device of claim 16, wherein for frequency channels below a predetermined frequency, a ramped threshold value is used for a most widely spaced microphone pair to account for reduced cancellation at frequencies below the predetermined frequency.

18. The machine hearing device of claim 17, wherein the global ratio mask and global binary mask are used to calculate a thresholded ratio mask, which has the global binary mask's zero values below a specified threshold, and the global ratio mask's continuous values above said threshold. The thresholded ratio mask, and inverse short-time frequency transforms, are applied to selected ones of the frequency-domain signals, thereby suppressing both the stationary and the non-stationary interfering sound sources and generating an audio output signal for driving the loudspeakers.

19. An assistive listening device for use in the presence of stationary interfering sound sources and/or non-stationary interfering sound sources, comprising
one or more pairs of in-ear or near-ear microphones, each microphone generating a respective audio input signal;
a pair of ear-worn loudspeakers; and
audio circuitry configured to compute a time-varying filter, for real-time speech intelligibility enhancement, using causal and memoryless frame-by-frame processing, comprising (1) applying a short-time frequency transform to each of the respective audio input signals, thereby converting the respective time domain signals into respective frequency-domain signals for every short-time analysis frame, (2) calculating a pairwise noise estimate by first subtracting the respective frequency-domain signals from a microphone pair and thereafter taking the magnitude of the difference, (3) calculating a pairwise mixture estimate by first taking the magnitudes of the respective frequency-domain signals from a microphone pair, and thereafter adding the respective magnitudes and (4) calculating a pairwise ratio mask from the pairwise noise estimate and the pairwise mixture estimates for a microphone pair, wherein the calculation of a pairwise ratio mask includes the aforementioned frequency-domain subtraction of signals, (5) calculating a global ratio mask, which is an effective time-varying filter with a vector of frequency channel weights for every short-time analysis frame, from the set of pairwise ratio masks, with the frequency channels from each pairwise ratio mask chosen according to the frequency range(s) for which the distinct intra-pair microphone spacing provides a positive absolute phase difference; wherein when using only one pair of microphones, the singular pairwise ratio mask and the global ratio mask are equivalent, and (6) applying the global ratio mask, or a post-processed variant thereof, and inverse short-time frequency transforms, to the frequency-domain signals from the in-ear or near-ear microphones, or to the frequency-domain output of a beamformer, thereby suppressing both the stationary and the non-stationary interfering sound sources in real-time and generating an audio output signal for driving the loudspeakers.

* * * * *